(12) United States Patent
Cheng et al.

(10) Patent No.: US 11,973,677 B2
(45) Date of Patent: Apr. 30, 2024

(54) METHOD AND DEVICE FOR CALCULATING BANDWIDTH UTILIZATION RATIO

(71) Applicants: China Mobile Communication Co., Ltd Research Institute, Beijing (CN); China Mobile Communications Group Co., Ltd., Beijing (CN)

(72) Inventors: Weiqiang Cheng, Beijing (CN); Han Li, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 531 days.

(21) Appl. No.: 17/277,798

(22) PCT Filed: Sep. 18, 2019

(86) PCT No.: PCT/CN2019/106369
§ 371 (c)(1),
(2) Date: Mar. 19, 2021

(87) PCT Pub. No.: WO2020/057533
PCT Pub. Date: Mar. 26, 2020

(65) Prior Publication Data
US 2021/0377143 A1   Dec. 2, 2021

(30) Foreign Application Priority Data

Sep. 20, 2018  (CN) .......................... 201811101731.X

(51) Int. Cl.
*H04L 43/0882* (2022.01)
*H04L 43/50* (2022.01)

(52) U.S. Cl.
CPC .......... *H04L 43/0882* (2013.01); *H04L 43/50* (2013.01)

(58) Field of Classification Search
CPC .......................... H04L 43/0882; H04L 43/50
See application file for complete search history.

(56) References Cited

U.S. PATENT DOCUMENTS

| | | | |
|---|---|---|---|
| 2009/0190595 A1* | 7/2009 | Jiang | H04L 25/4908 370/395.1 |
| 2012/0008503 A1* | 1/2012 | Qiu | H04L 45/00 370/238 |
| 2017/0019335 A1 | 1/2017 | Schultz et al. | |
| 2018/0013511 A1 | 1/2018 | Hussain et al. | |

(Continued)

FOREIGN PATENT DOCUMENTS

| | | |
|---|---|---|
| CN | 101583057 A | 11/2009 |
| CN | 102469019 A | 5/2012 |
| CN | 105099778 A | 11/2015 |

(Continued)

*Primary Examiner* — Chae S Lee
(74) *Attorney, Agent, or Firm* — Price Heneveld LLP

(57) ABSTRACT

A method and a device for calculating a bandwidth utilization ratio are provided in some embodiments of this disclosure. The method includes: determining a quantity of idle coding blocks in a plurality of coding blocks of a physical link, and calculating a bandwidth utilization ratio of the physical link according to a quantity of the coding blocks of the physical link and the quantity of the idle coding blocks.

12 Claims, 6 Drawing Sheets

(56) References Cited

U.S. PATENT DOCUMENTS

2018/0159785 A1 6/2018 Wu et al.
2020/0076731 A1* 3/2020 Zhong .................. H04L 1/0011

FOREIGN PATENT DOCUMENTS

| CN | 106411454 | A | 2/2017 |
|----|-----------|---|--------|
| CN | 107404526 | A | 11/2017 |
| CN | 107454019 | A | 12/2017 |
| CN | 108304288 | A | 7/2018 |
| CN | 108400936 | A | 8/2018 |
| WO | WO-2019184998 | A1 * | 10/2019 |

* cited by examiner

Fig. 2

METHOD AND DEVICE FOR CALCULATING BANDWIDTH UTILIZATION RATIO

CROSS-REFERENCE TO RELATED APPLICATION

This application is a U.S. national phase application of a PCT Application No. PCT/CN2019/106369 filed on Sep. 18, 2019, which claims a priority to Chinese Patent Application No. 201811101731.X filed on Sep. 20, 2018, the disclosure of which is incorporated herein by reference in its entirety.

TECHNICAL FIELD

The present disclosure relates to the field of wireless technologies, in particular to a method and a device for calculating a bandwidth utilization ratio.

BACKGROUND

A bandwidth utilization ratio is a ratio of an actual traffic on a link to a theoretical bandwidth of the link. The bandwidth utilization ratio may indicate a traffic condition of the link and how busy the link is, and is a most basic parameter for measuring a state of the link. In the related art, a formula for calculating the bandwidth utilization ratio is generally: bandwidth utilization ratio=data packet volume/(theoretical bandwidth×time period). The bandwidth utilization ratio is a concept involving a time period. Different time periods may be determined according to different analysis requirements. For example, to analyze a burst traffic, the time period should be as short as possible; while to analyze a traffic trend, the time period should be longer.

In the related art, the bandwidth utilization ratio is calculated by counting the volume of data packets within a period of time. However, there is a shortcoming in the above manner. That is, a statistical granularity is too large, and the smallest granularity is a data packet. Thus, a time scale required for counting is too large and a bandwidth utilization condition of a link cannot be reflected in real time.

Taking the transmission of a data packet with a frame size of 1518 bytes on a 100GBASE-R link as an example, in order to calculate a bandwidth utilization ratio of the link accurately, a counting lasting at least a time length of 100 data packets, which is about 12 μs, is required. Moreover, the transmission of an ultra-long frame may occur in a Flex Ethernet (FlexE), and the time period required for counting may be longer.

Based on the above reasons, there is an urgent need for a technical solution that has a short counting time and may reflect the bandwidth utilization condition in real time.

SUMMARY

A method and a device for calculating a bandwidth utilization ratio are provided in some embodiments of the present disclosure, so as to solve the problem in the related art that the counting time is long and the bandwidth utilization condition cannot be reflected in real time.

According to a first aspect of some embodiments of the present disclosure, a method for calculating a bandwidth utilization ratio is provided. The method includes: determining a quantity of idle coding blocks in a plurality of coding blocks of a physical link; and calculating a bandwidth utilization ratio of the physical link according to a quantity of the coding blocks of the physical link and the quantity of the idle coding blocks.

Optionally, the calculating the bandwidth utilization ratio of the physical link according to the quantity of the coding blocks and the quantity of the idle coding blocks includes: calculating the bandwidth utilization ratio of the physical link according to the following formula: bandwidth utilization ratio=(M-N)/M, where, M is the quantity of the coding blocks of the physical link, and N is the quantity of idle coding blocks.

Optionally, the idle coding blocks are encoded in a 64B/66B coding mode.

According to a second aspect of some embodiments of the present disclosure, another method for calculating a bandwidth utilization ratio is provided. The method includes: determining a quantity of idle coding blocks in coding blocks allocated to a Flex Ethernet (FlexE) user; and calculating a bandwidth utilization ratio of the FlexE user according to a quantity of the coding blocks allocated to the FlexE user and the quantity of the idle coding blocks.

Optionally, the calculating the bandwidth utilization ratio of the FlexE user according to a quantity of the coding blocks allocated to the FlexE user and the quantity of the idle coding blocks includes: calculating the bandwidth utilization ratio of the FlexE user according to the following formula: bandwidth utilization ratio=(P-Q)/P, where, P is the quantity of the coding blocks allocated to the FlexE user, and Q is the quantity of the idle coding blocks.

Optionally, the idle coding blocks are encoded in a 64B/66B coding mode.

According to a third aspect of some embodiments of the present disclosure, yet another method for calculating a bandwidth utilization ratio is provided. The method includes: determining a quantity of idle coding blocks in coding blocks of a FlexE group; and calculating a bandwidth utilization ratio of the FlexE group according to a quantity of the coding blocks of the FlexE group and the quantity of the idle coding blocks.

Optionally, the calculating the bandwidth utilization ratio of the FlexE group according to the quantity of the coding blocks of the FlexE group and the quantity of the idle coding blocks includes: calculating the bandwidth utilization ratio of the FlexE group according to the following formula: bandwidth utilization ratio=(X-Y)/X, where, X is the quantity of the coding blocks of the FlexE group, and Y is the quantity of the idle coding blocks.

Optionally, the idle coding blocks are encoded in a 64B/66B coding mode.

According to a fourth aspect of some embodiments of the present disclosure, a communication device is provided. The communication device includes: a first transceiver and a first processor. The first processor is configured to determine a quantity of idle coding blocks in a plurality of coding blocks of a physical link, and the first processor is further configured to calculate a bandwidth utilization ratio of the physical link according to a quantity of the coding blocks of the physical link and the quantity of the idle coding blocks.

Optionally, the first processor is further configured to calculate the bandwidth utilization ratio of the physical link according to the following formula: bandwidth utilization ratio=(M-N)/M, where, M is the quantity of the coding blocks of the physical link, and N is the quantity of the idle coding blocks.

Optionally, the idle coding blocks are encoded in a 64B/66B coding mode.

According to a fifth aspect of some embodiments of the present disclosure, a communication device is provided. The communication device includes: a second transceiver and a second processor. The second processor is configured to determine a quantity of idle coding blocks in coding blocks allocated to a Flex Ethernet (FlexE) user, and the second processor is further configured to calculate a bandwidth utilization ratio of the FlexE user according to a quantity of the coding blocks allocated to the FlexE user and the quantity of the idle coding blocks.

Optionally, the second processor is further configured to calculate the bandwidth utilization ratio of the FlexE user according to the following formula: bandwidth utilization ratio=(P-Q)/P, where, P is the quantity of coding blocks allocated to the FlexE user, and Q is the quantity of the idle coding blocks.

Optionally, the idle coding blocks are encoded in a 64B/66B coding mode.

According to a sixth aspect of some embodiments of the present disclosure, another communication device is provided. The communication device includes: a third transceiver and a third processor. The third processor is configured to determine a quantity of idle coding blocks in coding blocks of a FlexE group, and the third processor is further configured to calculate a bandwidth utilization ratio of the FlexE group according to a quantity of the coding blocks of the FlexE group and the quantity of the idle coding blocks.

Optionally, the calculating the bandwidth utilization ratio of the FlexE group according to the quantity of the coding blocks of the FlexE group and the quantity of the idle coding blocks includes: the third processor is further configured to calculate the bandwidth utilization ratio of the FlexE group according to the following formula: bandwidth utilization ratio=(X-Y)/X, where, X is the quantity of the coding blocks of the FlexE group, and Y is the quantity of the idle coding blocks.

Optionally, the idle coding blocks are encoded in a 64B/66B coding mode.

According to a seventh aspect of some embodiments of the present disclosure, a communication device is provided. The communication device includes a processor, a memory, and a computer program stored in the memory and configured to be executed by the processor. The processor is configured to execute the computer program to implement steps of the method for calculating the bandwidth utilization ratio according to the first aspect, or steps of the method for calculating the bandwidth utilization ratio according to the second aspect, or steps of the method for calculating the bandwidth utilization ratio according to the third aspect.

According to an eighth aspect of some embodiments of the present disclosure, a non-transitory computer readable storage medium having a computer program stored thereon is provided, the computer program is configured to be executed by a processor to implement steps of the method for calculating the bandwidth utilization ratio according to the first aspect, or steps of the method for calculating the bandwidth utilization ratio according to the second aspect, or steps of the method for calculating the bandwidth utilization ratio according to the third aspect.

In some embodiments of the present disclosure, the bandwidth utilization ratio is calculated based on the idle coding blocks. Thus, a statistical granularity is small, a time scale required for counting is shortened, and the bandwidth utilization ratio within a short time period may be accurately calculated. As a result, the bandwidth utilization condition may be reflected in real time.

BRIEF DESCRIPTION OF THE DRAWINGS

In order to illustrate the technical solutions of some embodiments of the present disclosure in a clearer manner, the drawings required for the description of some embodiments of the present disclosure will be described hereinafter briefly. Obviously, the following drawings merely relate to some embodiments of the present disclosure, and based on these drawings, a person of ordinary skill in the art may obtain other drawings without any creative effort.

FIG. 2 is a schematic diagram of FlexE coding block traffic according to some embodiments of the present disclosure;

DETAILED DESCRIPTION

In order to make the technical problems to be solved, the technical solutions and the advantages of the present disclosure more apparent, a detailed description will be given below with reference to the accompanying drawings and specific embodiments.

The technology described in the present disclosure is not limited to a long term evolution (LTE)/LTE-advanced (LTE-A) system, but also may be used in various wireless communication systems, such as a code division multiple access (CDMA), time division multiple access (TDMA), frequency division multiple access (FDMA), orthogonal frequency division multiple access (OFDMA), single-carrier frequency-division multiple access (SC-FDMA), and other systems, e.g., a fifth-generation mobile communication (5G) system and subsequent evolved communication systems.

Terms "system" and "network" are often used interchangeably. The CDMA system may implement such radio technologies as CDMA2000 and universal terrestrial radio access (UTRA). UTRA includes wideband code division multiple access (WCDMA) and other CDMA variants. The TDMA system may implement such radio technologies as global system for mobile communication (GSM). The OFDMA system may implement such radio technologies as ultra mobile broadband (UMB), evolution-UTRA (E-UTRA), IEEE 802.11 (Wi-Fi), IEEE 802.16 (WiMAX), IEEE 802.20, and Flash-OFDM. UTRA and E-UTRA are parts of universal mobile telecommunications system (UMTS). LTE and more advanced LTE (such as LTE-A) are new UMTS versions using E-UTRA. UTRA, E-UTRA, UMTS, LTE, LTE-A and GSM are described in literature from an organization called "3rd generation partnership project (3GPP)". CDMA2000 and UMB are described in literature from an organization called "3rd generation partnership project 2 (3GPP2)". The technology described herein not only may be used for the systems and radio technologies mentioned above, but also may be used for other systems and radio technologies.

Terms such as "first" and "second" in the description and claims of the present disclosure are used to differentiate similar objects, and not necessarily used to describe a specific sequence or order. It should be appreciated that the data used in this way may be interchanged under an appropriate circumstance, so that the embodiment of the present disclosure described herein, for example, may be implemented in a sequence other than those illustrated or described herein.

Figure 1:
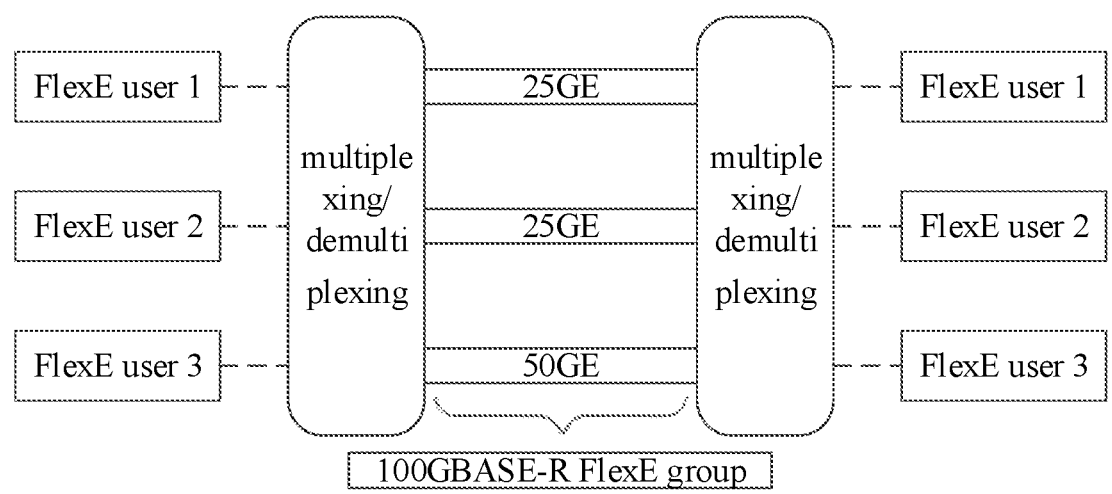
FIG. 1 is a schematic diagram of a FlexE sub-rating scenario according to some embodiments of the present disclosure.

Referring to FIG. 1, a FlexE sub-rating scenario is provided in some embodiments of the present disclosure. A 100GBASE-R physical link carries different traffics of three FlexE users, and a FlexE user 1, a FlexE user 2, and a FlexE user 3 are allocated with a 25 Gigabit Ethernet (GE) bandwidth, a 25GE bandwidth and a 50GE bandwidth respectively. The 100GE link is called a FlexE group.

Figure 2:
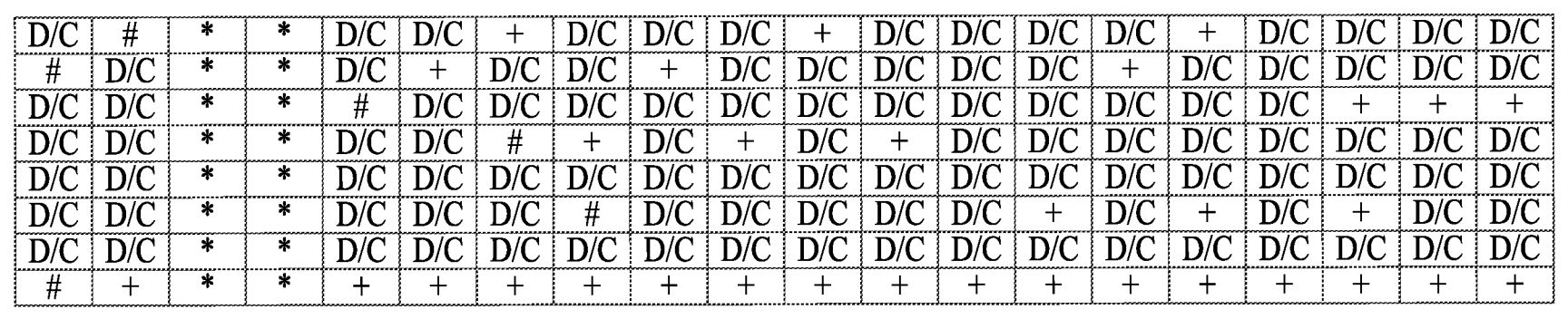

Further, referring to FIG. 2, FlexE coding block traffic is illustrated. Each grid represents a coding block, and each coding block is encoded in a 64B/66B coding mode. A coding block marked with "+" is an idle coding block, representing an unused bandwidth. Remaining coding blocks are used bandwidths.

Figure 3:
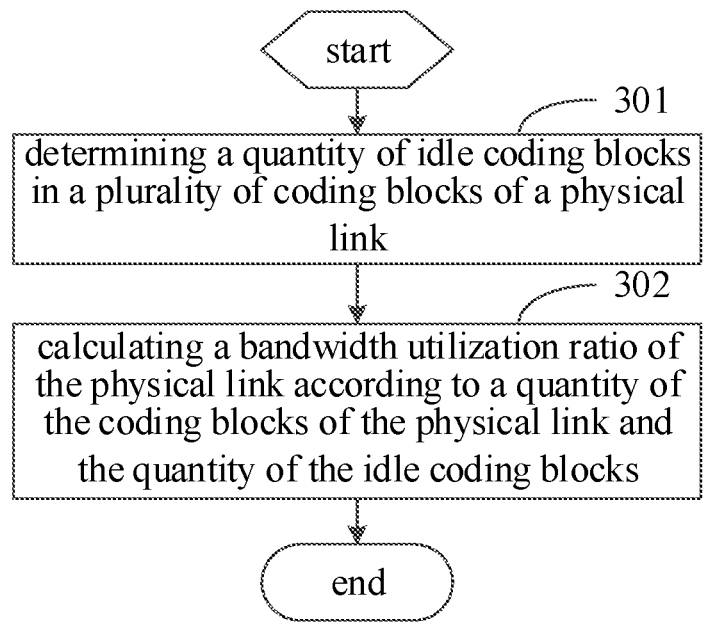
FIG. 3 is a first flow chart of a method for calculating a bandwidth utilization ratio according to some embodiments of the present disclosure.

Referring to FIG. 3, a method for calculating a bandwidth utilization ratio is provided according to some embodiments of the present disclosure. The method includes specific steps 301 and 302.

Step 301, determining a quantity of idle coding blocks in a plurality of coding blocks of a physical link.

In some embodiments of the present disclosure, the idle coding blocks are encoded in a 64B/66B coding mode.

Step 302, calculating a bandwidth utilization ratio of the physical link according to a quantity of the coding blocks of the physical link and the quantity of the idle coding blocks.

In some embodiments of the present disclosure, the bandwidth utilization ratio of the physical link is calculated according to the following formula: bandwidth utilization ratio=(M-N)/M, where, M is the quantity of the coding blocks of the physical link, and N is the quantity of idle coding blocks.

A time scale for calculating the bandwidth utilization ratio is a time length of N idle coding blocks. A value of N is adjusted according to the time scale actually needed. For example, when the value of N is 100, the corresponding time scale is 64 nanoseconds (ns). The time scale is very short. The bandwidth utilization ratio may be reflected in real-time when the bandwidth utilization ratio is calculated by using the time scale.

In some embodiments of the present disclosure, the bandwidth utilization ratio of the physical link is calculated based on the idle coding blocks of the physical link. Thus, a statistical granularity is small, a time scale required for counting is shortened, and the bandwidth utilization ratio of the physical link within a short time period may be accurately calculated. As a result, the bandwidth utilization condition may be reflected in real time.

Due to the mechanism of the FlexE, the FlexE user to which each coding block of 64B/66B coding block traffic belongs may be automatically identified, and the FlexE group to which each coding block of the 64B/66B coding block traffic belongs may be automatically identified. Therefore, the bandwidth utilization ratio of the FlexE user and the bandwidth utilization ratio of the FlexE group may be calculated based on the idle coding blocks.

Figure 4:
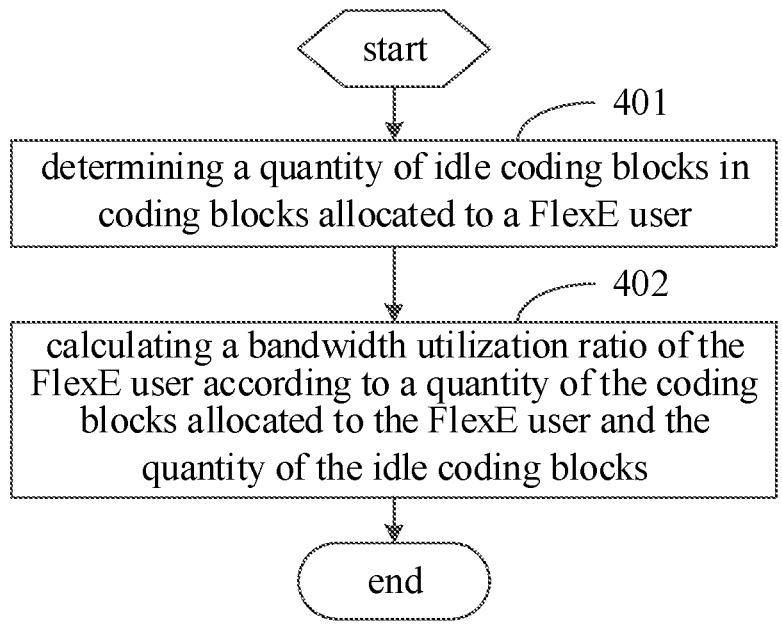
FIG. 4 is a second flow chart of a method for calculating a bandwidth utilization ratio according to some embodiments of the present disclosure.

Referring to FIG. 4, another method for calculating a bandwidth utilization ratio is provided according to some embodiments of the present disclosure. The method includes specific steps 401 and 402.

Step 401, determining a quantity of idle coding blocks in coding blocks allocated to a FlexE user.

In some embodiments of the present disclosure, the idle coding blocks are encoded in a 64B/66B coding mode.

Step 402, calculating a bandwidth utilization ratio of the FlexE user according to a quantity of the coding blocks allocated to the FlexE user and the quantity of the idle coding blocks.

In some embodiments of the present disclosure, the bandwidth utilization ratio of the FlexE user is calculated according to the following formula: bandwidth utilization ratio=(P-Q)/P, where, P is the quantity of the coding blocks allocated to the FlexE user, and Q is the quantity of idle coding blocks. In the process of calculation, the value of P may be specified as needed. If a small time scale is needed, Q is given a smaller value; if a large time scale is needed, Q is given a larger value.

In some embodiments of the present disclosure, the bandwidth utilization ratio of the FlexE user is calculated based on the idle coding blocks allocated to the FlexE user. Thus, a statistical granularity is small, a time scale required for counting is shortened, and the bandwidth utilization ratio of the FlexE user within a short time period may be accurately calculated. As a result, the bandwidth utilization condition may be reflected in real time.

Figure 5:
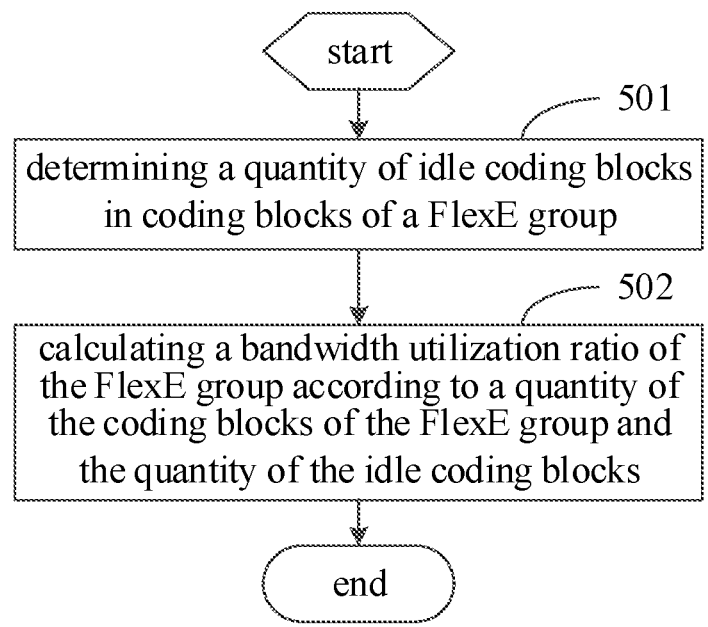
FIG. 5 is a third flow chart of a method for calculating a bandwidth utilization ratio according to some embodiments of the present disclosure.

Referring to FIG. 5, yet another method for calculating a bandwidth utilization ratio is provided according to some embodiments of the present disclosure. The method includes specific steps 501 and 502.

Step 501, determining a quantity of idle coding blocks in coding blocks of a FlexE group.

In some embodiments of the present disclosure, the idle coding blocks are encoded in a 64B/66B coding mode.

Step 502, calculating a bandwidth utilization ratio of the FlexE group according to a quantity of the coding blocks of the FlexE group and the quantity of the idle coding blocks.

In some embodiments of the present disclosure, the bandwidth utilization ratio of the FlexE group is calculated according to the following formula: bandwidth utilization ratio=(X-Y)/X, where, X is the quantity of the coding blocks of the FlexE group, and Y is the quantity of the idle coding blocks.

In some embodiments of the present disclosure, the bandwidth utilization ratio of the FlexE group is calculated based on the idle coding blocks in the FlexE group. Thus, a statistical granularity is small, a time scale required for counting is shortened, and the bandwidth utilization ratio of the FlexE group within a short time period may be accurately calculated. As a result, the bandwidth utilization condition may be reflected in real time.

Figure 6:
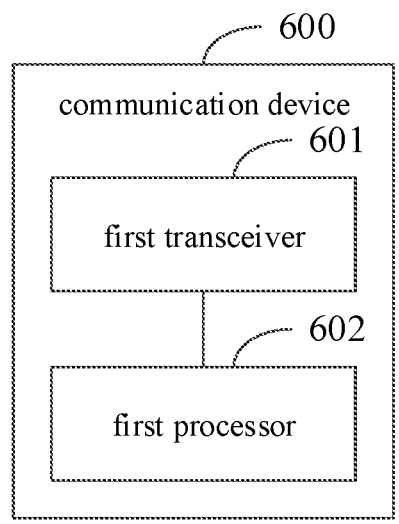
FIG. 6 is a first schematic structural diagram of a communication device according to some embodiments of the present disclosure.

Referring to FIG. 6, a communication device 600 is provided according to some embodiments of the present disclosure. The communication device 600 includes: a first transceiver 601 and a first processor 602. The first processor 602 is configured to determine a quantity of idle coding blocks in a plurality of coding blocks of a physical link, and the first processor 602 is further configured to calculate a bandwidth utilization ratio of the physical link according to a quantity of the coding blocks of the physical link and the quantity of the idle coding blocks.

Optionally, the first processor 602 is further configured to calculate the bandwidth utilization ratio of the physical link according to the following formula: bandwidth utilization ratio=(M-N)/M, where, M is the quantity of the coding blocks of the physical link, and N is the quantity of idle coding blocks.

Optionally, the idle coding blocks are encoded in a 64B/66B coding mode.

In some embodiments of the present disclosure, the bandwidth utilization ratio of the physical link is calculated based on the idle coding blocks of the physical link. Thus, a statistical granularity is small, a time scale required for counting is shortened, and the bandwidth utilization ratio of the physical link within a short time period may be accurately calculated. As a result, the bandwidth utilization condition may be reflected in real time.

Figure 7:
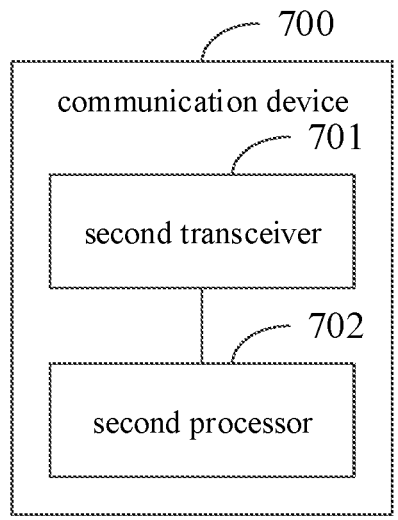
FIG. 7 is a second schematic structural diagram of a communication device according to some embodiments of the present disclosure.

Referring to FIG. 7, another communication device 700 is provided according to some embodiments of the present disclosure. The communication device 700 includes: a second transceiver 701 and a second processor 702. The second processor 702 is configured to determine a quantity of idle coding blocks in coding blocks allocated to a Flex Ethernet (FlexE) user, and the second processor 702 is further configured to calculate a bandwidth utilization ratio of the FlexE user according to a quantity of the coding blocks allocated to the FlexE user and the quantity of the idle coding blocks.

Optionally, the second processor 702 is further configured to calculate the bandwidth utilization ratio of the FlexE user according to the following formula: bandwidth utilization ratio=(P-Q)/P, where, P is the quantity of the coding blocks allocated to the FlexE user, and Q is the quantity of idle coding blocks.

Optionally, the idle coding blocks are encoded in a 64B/66B coding mode.

In some embodiments of the present disclosure, the bandwidth utilization ratio of the FlexE user is calculated based on the idle coding blocks allocated to the FlexE user. Thus, a statistical granularity is small, a time scale required for counting is shortened, and the bandwidth utilization ratio of the FlexE user within a short time period may be accurately calculated. As a result, the bandwidth utilization condition may be reflected in real time.

Figure 8:
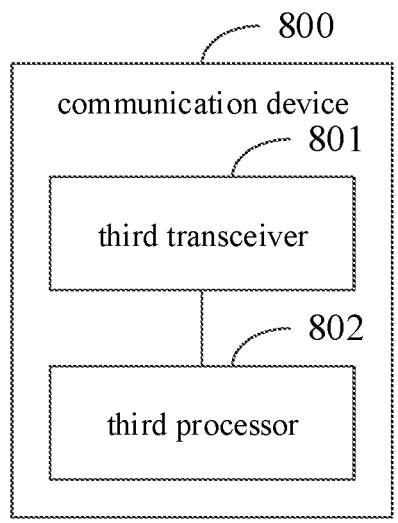
FIG. 8 is a third schematic structural diagram of a communication device according to some embodiments of the present disclosure.

Referring to FIG. 8, yet another communication device 800 is provided according to some embodiments of the present disclosure. The communication device 800 includes: a third transceiver 801 and a third processor 802. The third processor 802 is configured to determine a quantity of idle coding blocks in coding blocks in a FlexE group, and the third processor 802 is further configured to calculate a bandwidth utilization ratio of the FlexE group according to a quantity of the coding blocks of the FlexE group and the quantity of the idle coding blocks.

Optionally, the calculating the bandwidth utilization ratio of the FlexE group according to the quantity of the coding blocks of the FlexE group and the quantity of the idle coding blocks includes: the third processor 802 is further configured to calculate the bandwidth utilization ratio of the FlexE group according to the following formula: bandwidth utilization ratio=(X-Y)/X, where, X is the quantity of the coding blocks of the FlexE group, and Y is the quantity of the idle coding blocks.

Optionally, the idle coding blocks are encoded in a 64B/66B coding mode.

In some embodiments of the present disclosure, the bandwidth utilization ratio of the FlexE group is calculated based on the idle coding blocks in the FlexE group. Thus, a statistical granularity is small, a time scale required for counting is shortened, and the bandwidth utilization ratio of the FlexE group within a short time period may be accurately calculated. As a result, the bandwidth utilization condition may be reflected in real time.

Figure 9:
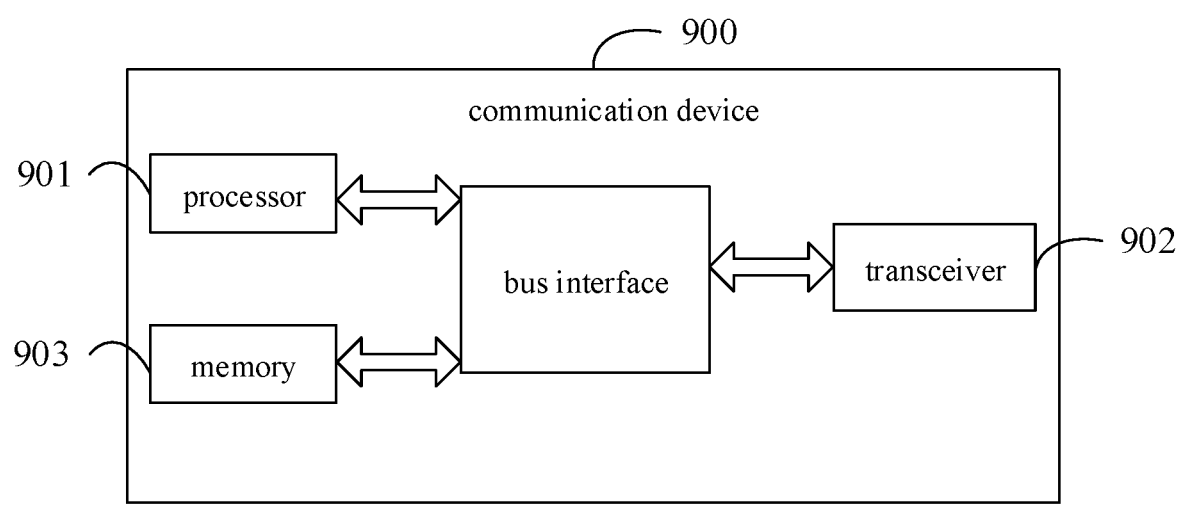
FIG. 9 is a fourth schematic structural diagram of a communication device according to some embodiments of the present disclosure.

Referring to FIG. 9, still another communication device 900 is provided according to some embodiments of the present disclosure. The communication device 900 includes: a processor 901, a transceiver 902, a memory 903 and a bus interface.

The processor 901 may be responsible for managing the bus architecture and general processing, and the memory 903 may store data used by the processor 901 when performing operations.

In some embodiments of the present disclosure, the communication device 900 may further include: a computer program stored in the memory 903 and configured to be executed by the processor 901. The processor 901 is configured to execute the computer program to implement steps of the methods according to some embodiments of the present disclosure.

In FIG. 9, the bus architecture may include any quantity of interconnected buses and bridges, and links various circuits such as one or more processors specifically represented by the processor 901 and a memory represented by the memory 903. Various other circuits such as peripherals, voltage regulators, and power management circuits may be further linked by the bus architecture, which are well known in the art and, therefore, will not be further described in some embodiments of the present disclosure. The bus interface provides an interface. The transceiver 902 may be a plurality of components, i.e., including a transmitter and a receiver, and may provide units for communicating with various other devices via a transmission medium.

A computer readable storage medium is further provided in some embodiments of the present disclosure. The computer readable storage medium having a computer program stored thereon, the computer program is configured to be executed by a processor to implement processes in the embodiments of the methods for calculating a bandwidth utilization ratio in some embodiments of the present disclosure, and a same technical effect may be achieved. To avoid repetition, details are not described herein again. For example, the computer readable storage medium is a read-only memory (ROM), a random access memory (RAM), a magnetic disk, an optical disc, or the like.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent in the process, the method, the article, or the device. In a case that there is no further limitation, an element preceded by "includes or including" does not preclude existence of additional identical elements in the process, the method, the article, or the device including the element.

It should be appreciated that, "one embodiment" or "an embodiment" mentioned throughout the description means specific features, structures or characteristics related to the embodiments are included in at least one embodiment of the present disclosure. Therefore, "in one embodiment" or "in an embodiment" mentioned throughout the description does not necessarily refer to the same embodiment. Additionally, the specific features, structures or characteristics may be combined in any suitable manner in one or more embodiments.

In various embodiments of the present disclosure, it should be appreciated that, the sequence numbers of the above-mentioned processes do not mean priorities of performing the processes, which should be determined by functions and internal logic of the processes, and are not to be construed as limiting the implementation processes of the embodiments the present disclosure.

In the embodiments of the present disclosure, it should be appreciated that "B corresponding to A" means that B is associated with A, and B may be determined from A. However, it should be further appreciated that, determining B from A does not mean that B is determined only from A. It is also possible that B is determined from A and/or other information.

In the embodiments provided in the present application, it should be appreciated that the disclosed device and method may be implemented in other manners. For example, the device embodiments described above are merely illustrative. For example, the division of the unit is only a logical function division. In practical implementation, there may be another division manner, for example, a plurality of units or components may be combined or may be integrated into another system, or some features may be ignored or not implemented. In addition, the mutual coupling or direct coupling or communication connection shown or discussed may be an indirect coupling or communication connection through some interface, device or unit, and may be in an electrical, mechanical or other form.

In addition, each functional unit in various embodiments of the present disclosure may be integrated into one processing unit, or each unit may exist alone physically, or two or more units may be integrated into one unit. The above-mentioned integrated unit may be realized in the form of hardware or hardware plus software functional units.

The integrated unit realized in the form of software functional units may be stored in a computer readable storage medium. The software functional units may be stored in a storage medium including several instructions to cause a computer device (which may be a personal computer, a server, or a network device, etc.) to perform some steps of the methods according to the embodiments of the present disclosure. The foregoing storage medium includes various media that may store program codes, such as a USB flash drive, a mobile hard disk, a read-only memory (ROM), a random access memory (RAM), a magnetic disk, or an optical disc.

The foregoing describes optional implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A method for calculating a bandwidth utilization ratio, comprising:
   determining a quantity of idle coding blocks in a plurality of coding blocks of a physical link of a FlexE group; and
   calculating a bandwidth utilization ratio of the physical link according to a quantity of the coding blocks of the physical link and the quantity of the idle coding blocks, wherein the bandwidth utilization ratio is a ratio of actual traffic on the physical link to a theoretical bandwidth of the physical link;
   wherein the calculating the bandwidth utilization ratio of the physical link according to the quantity of the coding blocks of the physical link and the quantity of the idle coding blocks comprises:
   calculating the bandwidth utilization ratio of the physical link according to following formula:
   bandwidth utilization ratio=(M-N)/M,
   wherein, M is the quantity of the coding blocks of the physical link, and N is the quantity of the idle coding blocks.

2. The method according to claim 1, wherein the idle coding blocks are encoded in a 64B/66B coding mode.

3. A method for calculating a bandwidth utilization ratio, comprising:
   determining a quantity of idle coding blocks in coding blocks allocated to a Flex Ethernet (FlexE) user; and
   calculating a bandwidth utilization ratio of the FlexE user according to a quantity of the coding blocks allocated to the FlexE user and the quantity of the idle coding blocks, wherein the bandwidth utilization ratio is a ratio of actual traffic of the FlexE user to a theoretical bandwidth allocated to the FlexE user;
   wherein the calculating the bandwidth utilization ratio of the FlexE user according to the quantity of the coding blocks allocated to the FlexE user and the quantity of the idle coding blocks comprises:
   calculating the bandwidth utilization ratio of the FlexE user according to following formula:
   bandwidth utilization ratio=(P-Q)/P,
   wherein, P is the quantity of the coding blocks allocated to the FlexE user, and Q is the quantity of the idle coding blocks.

4. The method according to claim 3, wherein the idle coding blocks are encoded in a 64B/66B coding mode.

5. A method for calculating a bandwidth utilization ratio, comprising:
   determining a quantity of idle coding blocks in coding blocks of a FlexE group; and
   calculating a bandwidth utilization ratio of the FlexE group according to a quantity of the coding blocks of the FlexE group and the quantity of the idle coding blocks, wherein the bandwidth utilization ratio is a ratio of actual traffic of the FlexE group to a theoretical bandwidth of the FlexE group;
   wherein the calculating the bandwidth utilization ratio of the FlexE group according to the quantity of the coding blocks of the FlexE group and the quantity of the idle coding blocks comprises:
   calculating the bandwidth utilization ratio of the FlexE group according to following formula:
   bandwidth utilization ratio=(X-Y)/X,
   wherein, X is the quantity of the coding blocks of the FlexE group, and Y is the quantity of the idle coding blocks.

6. The method according to claim 5, wherein the idle coding blocks are encoded in a 64B/66B coding mode.

7. A communication device, comprising a processor, a memory, and a computer program stored in the memory and configured to be executed by the processor, wherein the processor is configured to execute the computer program to implement steps of the method for calculating the bandwidth utilization ratio according to claim 1.

8. A non-transitory computer readable storage medium having a computer program stored thereon, wherein the computer program is configured to be executed by a processor to implement steps of the method for calculating the bandwidth utilization ratio according to claim 1.

9. A communication device, comprising a processor, a memory, and a computer program stored in the memory and configured to be executed by the processor, wherein the processor is configured to execute the computer program to implement steps of the method for calculating the bandwidth utilization ratio according to claim 3.

10. A communication device, comprising a processor, a memory, and a computer program stored in the memory and configured to be executed by the processor, wherein the processor is configured to execute the computer program to implement steps of the method for calculating the bandwidth utilization ratio according to claim 5.

11. A non-transitory computer readable storage medium having a computer program stored thereon, wherein the computer program is configured to be executed by a processor to implement steps of the method for calculating the bandwidth utilization ratio according to claim 3.

12. A non-transitory computer readable storage medium having a computer program stored thereon, wherein the computer program is configured to be executed by a processor to implement steps of the method for calculating the bandwidth utilization ratio according to claim 5.

* * * * *